United States Patent
Bejerano et al.

(10) Patent No.: US 9,148,259 B2
(45) Date of Patent: Sep. 29, 2015

(54) METHOD AND APPARATUS FOR IMPROVED MULTICAST SERVICE USING NEGOTIATED FEEDBACK

(71) Applicant: Alcatel-Lucent USA Inc., Murray Hill, NJ (US)

(72) Inventors: Yigal Bejerano, Springfield, NJ (US); Katherine H Guo, Scotch Plains, NJ (US); Suresh Goyal, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/041,991

(22) Filed: Sep. 30, 2013

(65) Prior Publication Data

US 2015/0092620 A1   Apr. 2, 2015

(51) Int. Cl.
*H04L 12/18* (2006.01)
*H04L 1/16* (2006.01)
*H04L 1/18* (2006.01)
*H04L 12/801* (2013.01)

(52) U.S. Cl.
CPC ............ *H04L 1/1628* (2013.01); *H04L 1/1845* (2013.01); *H04L 1/1854* (2013.01); *H04L 12/189* (2013.01); *H04L 12/1868* (2013.01); *H04L 47/14* (2013.01); *H04L 47/15* (2013.01)

(58) Field of Classification Search
CPC ...................................................... H04L 47/15
USPC ........... 370/252–253, 312, 328–339; 455/445
See application file for complete search history.

(56) References Cited

U.S. PATENT DOCUMENTS

2007/0099621 A1* 5/2007 Bergqvist et al. ............. 455/445
2012/0213097 A1* 8/2012 Bejerano et al. .............. 370/252

OTHER PUBLICATIONS

Chandra,R.; Karanth,S.;Moscibroda,T.;Navda,V.;Padhye,J.; Ramjee,R.;Ravindranath,L.; "DirCast:A Practical & Efficient Wi-Fi Multicast Sys.", ICNP 2009, pp. 161-170, Oct. 13-16, 2009.
CISCO—White Paper—"Optimizing Enterprise Video Over Wireless" LAN, 2010.
Aruba Networks "Aruba Video Quick Reference & Design Guide" 2009.
Venkatesan, G., Ashley, A., 802.11aa—"Robust Audio Video Transport Streaming San Francisco Closing Report" Jul. 2009.
Maraslis, K.; Chatzimisios,P.; Boucouvalas,A., "IEEE 802.11AA:" Improvements on Video Transmission Over Wireless LANs, 2012.
Kuri, J., and Kashera S.K. "Reliable Multicast in Multi-Access Wireless LANs", ACM Wirel. Netw., 2001, 7, (4), pp. 359-369.

(Continued)

*Primary Examiner* — Iqbal Zaidi
(74) *Attorney, Agent, or Firm* — Jeffrey K. Jacobs

(57) ABSTRACT

Various methods and devices are provided to address the need for improved multicast operation. In one method, a feedback mobile device receives (301), from a multicast sender, a multicast transmission for a plurality of mobile devices, the plurality of mobile devices further including a group of non-feedback mobile devices. The feedback mobile device transmits (302) an indication of feedback mobile channel quality observed by the feedback mobile device to the multicast sender and to the group of non-feedback mobile devices. The feedback mobile device receives (303) from at least one non-feedback mobile device, an indication of non-feedback mobile channel quality at the at least one non-feedback mobile device and transmits (304) an indication of the non-feedback mobile channel quality to the multicast sender and to the group of non-feedback mobile devices.

9 Claims, 4 Drawing Sheets

(56) References Cited

OTHER PUBLICATIONS

Zhao Li, Herfet,T. "BLBP: A Beacon-Driven Leader Based Protocol for MAC Layer Multicast Error Control in Wireless LANs", WICOM '08 4th Intl Conf Oct. 12-14, 2008, pp. 1-4.

Zhao Li, Herfet,T. "HLBP: A Hybrid Leader Based Protocol for MAC Layer Multicast Error Control in Wireless LANs", IEEE GLOBECOM 2008, Vol., No, pp. 1-6 Nov. 30, 2008-Dec. 4, 2008.

Gupta,S.K.S; Shankar,V.; Lalwani,S; "Reliable Multicast MAC Protocol for Wireless LANs", IEEE ICC, Anchorage, USA, May 2003, pp. 93-97.

Seok, Y., and Coi, Y. "Efficient Multicast Supporting in Multi-Rate Wireless Local Area Networks" Lecture notes Comput. Sci, 2003-2662, pp. 273-283.

Basalamah,A., Sugimoto,H., and Sato, T., "Rate Adaptive Reliable Multicast MAC Protocol for WLANs", Proc. VTC, Melbourne, AUS, May 2006, pp. 1212-1220.

Villalon,J;Cuenca,P.;Orozco-Barbosa,L.;Seok, Y;Turletti, T.;ARSM A Cross-Layer Auto Rate Selection Multicast Mech. for Multi-Rate Wirels LANs, IET, V5.1, N5, pp. 893-902 Oct. 2007.

\* cited by examiner

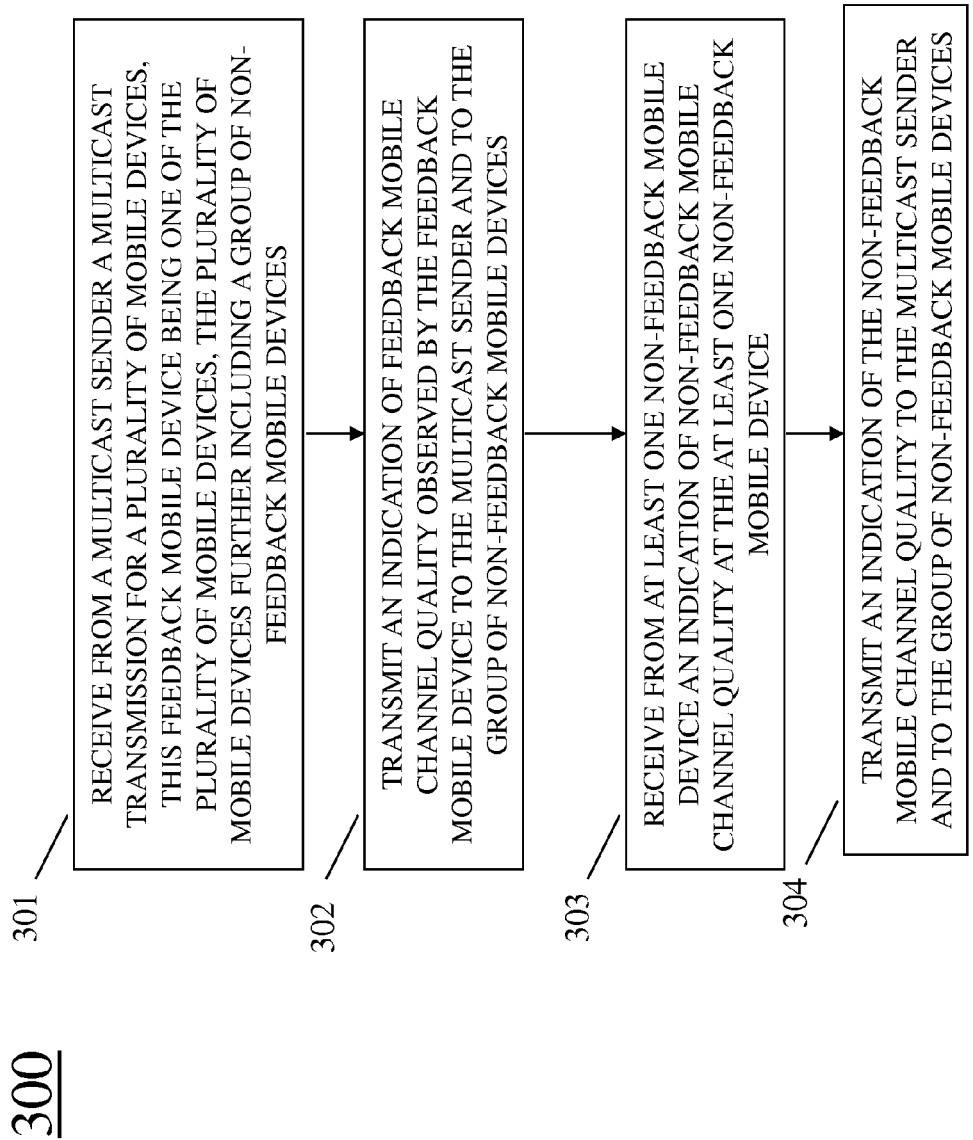

400

401 — RECEIVE FROM A MULTICAST SENDER A MULTICAST TRANSMISSION FOR A PLURALITY OF MOBILE DEVICES, THIS NON-FEEDBACK MOBILE DEVICE BEING ONE OF THE PLURALITY OF MOBILE DEVICES, THE PLURALITY OF MOBILE DEVICES FURTHER INCLUDING A FEEDBACK MOBILE DEVICE

402 — RECEIVE FROM THE FEEDBACK MOBILE DEVICE AN INDICATION OF FEEDBACK MOBILE CHANNEL QUALITY AT THE FEEDBACK MOBILE DEVICE

403 — DETERMINE WHETHER TO REPORT AN INDICATION OF NON-FEEDBACK MOBILE CHANNEL QUALITY BASED ON CHANNEL QUALITY OBSERVED BY THE NON-FEEDBACK MOBILE DEVICE

404 — TRANSMIT AN INDICATION OF THE NON-FEEDBACK MOBILE CHANNEL QUALITY OBSERVED BY THE NON-FEEDBACK MOBILE DEVICE TO THE FEEDBACK MOBILE DEVICE

FIG. 4

METHOD AND APPARATUS FOR IMPROVED MULTICAST SERVICE USING NEGOTIATED FEEDBACK

REFERENCE(S) TO RELATED APPLICATION(S)

This application is related to a co-pending application Ser. No. 12/962,362, entitled "METHOD AND APPARATUS FOR IMPROVED MULTICAST SERVICE," filed Dec. 7, 2010, which is commonly owned and incorporated herein by reference in its entirety.

This application is related to a co-pending application Ser. No. 13/031,395, entitled "METHOD AND APPARATUS FOR IMPROVED MULTICAST SERVICE USING FEEDBACK MOBILES," filed Feb. 21, 2011, which is commonly owned and incorporated herein by reference in its entirety.

FIELD OF THE INVENTION

The present invention relates generally to communications and, in particular, to multicast service in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

In recent years, there has been a rapid growth of smart mobile devices (i.e. smart-phones) that among other things, allow the users to browse the web and watch video clips. These new capabilities open up a new and untapped market with sizable revenue opportunities for various stakeholders by enabling rich multimedia content delivery to mobile users. Today, the vast majority of the smart-phones are equipped with Wi-Fi and cellular radios, and both interfaces can be used for content delivery. However, using existing technologies, rich multimedia content such as video streams cannot be provided in crowded areas due to the high bandwidth requirements of delivering such content and the shortage of wireless resources in both the cellular and the Wi-Fi networks.

Thus, new solutions and techniques that are able to address these issues and support rich multimedia content delivery in crowded areas would meet a need and advance wireless communications generally.

BRIEF DESCRIPTION OF THE DRAWINGS

FIG. 3 is a logic flow diagram of functionality performed by a feedback mobile device in accordance with various embodiments of the present invention.

FIG. 4 is a logic flow diagram of functionality performed by a non-feedback mobile device in accordance with various embodiments of the present invention.

Figure 1:
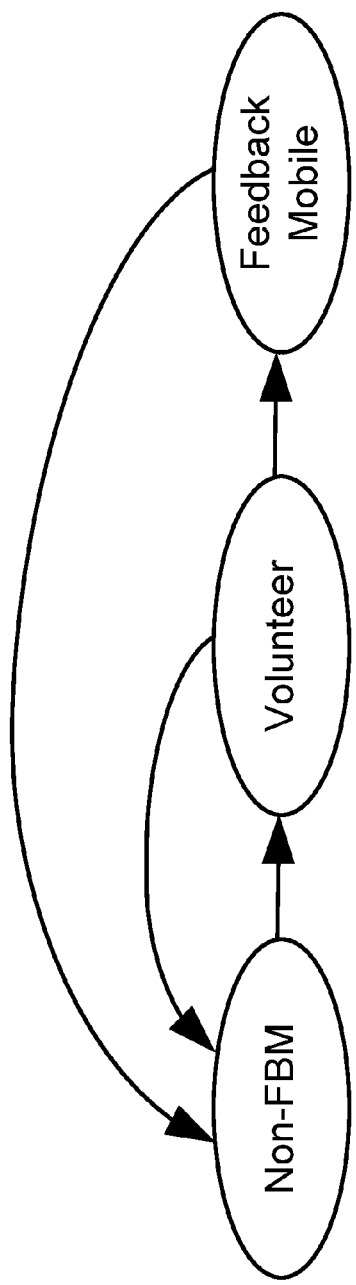
FIG. 1 is a block diagram depiction of a mobile state diagram, in accordance with various embodiments of the present invention.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved multicast operation. In a first method, a feedback mobile device receives, from a multicast sender, a multicast transmission for a plurality of mobile devices, the feedback mobile device being one of the plurality of mobile devices, the plurality of mobile devices further including a group of non-feedback mobile devices. The feedback mobile device transmits an indication of feedback mobile channel quality observed by the feedback mobile device to the multicast sender and to the group of non-feedback mobile devices. The feedback mobile device receives from at least one non-feedback mobile device, an indication of non-feedback mobile channel quality at the at least one non-feedback mobile device and transmits an indication of the non-feedback mobile channel quality to the multicast sender and to the group of non-feedback mobile devices. An article of manufacture is also provided, the article comprising a non-transitory, processor-readable storage medium storing one or more software programs which when executed by one or more processors performs the steps of this method.

Many embodiments are provided in which the method above is modified. For example, in many embodiments receiving the multicast transmission, by the feedback mobile device from the multicast sender, involves receiving the multicast transmission via a first wireless access network and transmitting by the feedback mobile device the indication of feedback mobile channel quality observed by the feedback mobile device to the multicast sender involves transmitting the indication of feedback mobile channel quality to the multicast sender via a second wireless access network. In some embodiments, the first wireless access network is a cellular wireless network and the second wireless access network is an IEEE 802.11-based wireless network.

In many embodiments, transmitting by the feedback mobile device the indication of feedback mobile channel quality observed by the feedback mobile device to the multicast sender and to the group of non-feedback mobile devices involves transmitting the indication separately to the multicast sender and to the group of non-feedback mobile devices. Also, in many embodiments, transmitting by the feedback mobile device the indication of the non-feedback mobile channel quality to the multicast sender and to the group of non-feedback mobile devices involves transmitting the indication separately to the multicast sender and to the group of non-feedback mobile devices. In some embodiments, transmitting by the feedback mobile device the indication of the non-feedback mobile channel quality to the multicast sender and to the group of non-feedback mobile devices involves additionally transmitting, to the group of non-feedback mobile devices, an indication of feedback mobile channel quality observed by the feedback mobile device and an indication of the identity of the at least one non-feedback mobile device.

In a second method, a non-feedback mobile device receives, from a multicast sender, a multicast transmission for a plurality of mobile devices, the non-feedback mobile device being one of the plurality of mobile devices, the plurality of mobile devices further including a feedback mobile device. The non-feedback mobile device receives, from the feedback mobile device, an indication of feedback mobile channel quality at the feedback mobile device and determines whether to report an indication of non-feedback mobile channel quality based on channel quality observed by the non-feedback mobile device. The non-feedback mobile device then transmits an indication of the non-feedback mobile channel quality observed by the non-feedback mobile device to the feedback mobile device. An article of manufacture is also provided, the article comprising a non-transitory, processor-readable storage medium storing one or more software programs which when executed by one or more processors performs the steps of this method.

Many embodiments are provided in which this second method is modified. For example, in many embodiments, determining by the non-feedback mobile device whether to report involves determining that the channel quality observed by the non-feedback mobile device is lower than the feedback mobile channel quality indicated. In some embodiments, the non-feedback mobile device also receives an indication of non-feedback mobile channel quality from the feedback mobile device and determines, as part of determining whether to report, that the channel quality observed by the non-feedback mobile device is lower than the non-feedback mobile channel quality indicated. In some embodiments, determining by the non-feedback mobile device whether to report involves delaying to report when the non-feedback mobile device is not a reporter non-feedback mobile device.

A first mobile device apparatus is also provided. The mobile device is one of a plurality of mobile devices, the plurality of mobile devices including a group of feedback mobile devices and a group of non-feedback mobile devices, and the mobile device is one of the group of feedback mobile devices. The mobile device includes a transceiver and a processing unit, communicatively coupled to the transceiver, configured to receive, via the transceiver from a multicast sender, a multicast transmission for the plurality of mobile devices. The processing unit is also configured to transmit, via the transceiver, an indication of feedback mobile channel quality observed by the mobile device to the multicast sender and to the group of non-feedback mobile devices, to receive, via the transceiver from at least one non-feedback mobile device, an indication of non-feedback mobile channel quality at the at least one non-feedback mobile device, and to transmit, via the transceiver, an indication of the non-feedback mobile channel quality to the multicast sender and to the group of non-feedback mobile devices. Many embodiments are provided in which this first mobile device is modified. Examples of such embodiments can be found described above with respect to the first method.

A second mobile device apparatus is also provided. This mobile device is one of a plurality of mobile devices, the plurality of mobile devices including a group of feedback mobile devices and a group of non-feedback mobile devices, and this mobile device is one of the group of non-feedback mobile devices. This mobile device includes a transceiver and a processing unit, communicatively coupled to the transceiver, configured to receive via the transceiver a multicast transmission for the plurality of mobile devices from a multicast sender and to receive, via the transceiver from a feedback mobile device, an indication of feedback mobile channel quality at the feedback mobile device. The processing unit is also configured to determine whether to report an indication of non-feedback mobile channel quality based on channel quality observed by the mobile device and to transmit, via the transceiver an indication of the non-feedback mobile channel quality observed by the mobile device to the feedback mobile device. Many embodiments are provided in which this second mobile device is modified. Examples of such embodiments can be found described above with respect to the second method.

DETAILED DESCRIPTION OF EMBODIMENTS

To address some of the issues involved in rich multimedia content delivery, selective feedback mechanisms are proposed to enable the efficient delivery of live multimedia content in crowded places. This approach utilizes an overlay multicast service for efficiently distributing the desired multimedia content to a large user population. The proposed service can be an attractive medium for distributing live TV programs such as news and/or sports updates as well as venue-specific content, such as the coverage of events and replays from different camera angles in a stadium.

Currently, when a set of users require the same data stream, e.g. a video feed, there are two basic approaches for delivering the content:

(a) Unicast: Each user requests the stream individually from the video server via IP-layer unicast. This implies that each user requests a dedicated feed from the server and the wireless system (either WiFi or cellular) will send the feed and process any acknowledgements sent by the user. With this approach, the number of users that can be supported is a function of the available bandwidth of the system. For instance, for current typical Wi-Fi systems based on IEEE 802.11g/an optimistic upper bound of this number cannot exceed more than 50 users, distributed uniformly, for a video stream of 300 Kbps. In the case of a cellular system this number may be even lower. A remedy is to scale this by deploying multiple Access Points (APs) or small-cells in adjacent locations on different non-interfering channels, however this solution requires a massive deployment of APs or small-cells and still may suffer from bandwidth limitation due to the limited number of available channels.

(b) Multicast: This is an approach that can address the capacity bottleneck over the wireless air interface. In its simplest version, groups of users requesting the same data stream can join a multicast group that is provided by either the cellular system (LTE) or a WiFi network. In both cases, the multicast services are offered as best efforts, and the user cannot provide feedback to the system about his or her quality of experience. Addressing this shortage of multicast services, there are several proposals that provide solutions to this shortage for WiFi networks. However, all these solutions suffer from some limitations that hinder their ability to provide appropriate multimedia content delivery in crowded areas. In the case of cellular systems, e.g. LTE, we are not aware of any proposal to augment the multicast services with a feedback mechanism.

Currently, most wireless systems already support multicast services. Again however, these services are based on best effort transmission without feedback from the receivers. Thus, the system is not aware of the quality of service (QoS) that the users experience, which raises two main concerns. (i) The system may utilize its resources inefficiently, for instance by using a lower bit rate than needed. (ii) Even more importantly, the receivers may suffer from low quality of experience without the ability to report any problems to the system. In embodiments proposed below, the system will be able to monitor the multicast channel quality and QoS observed by users and tune the network operation (e.g., bit-rate, retransmission, FEC, etc.) accordingly, while efficiently using the system resources.

Figure 2:
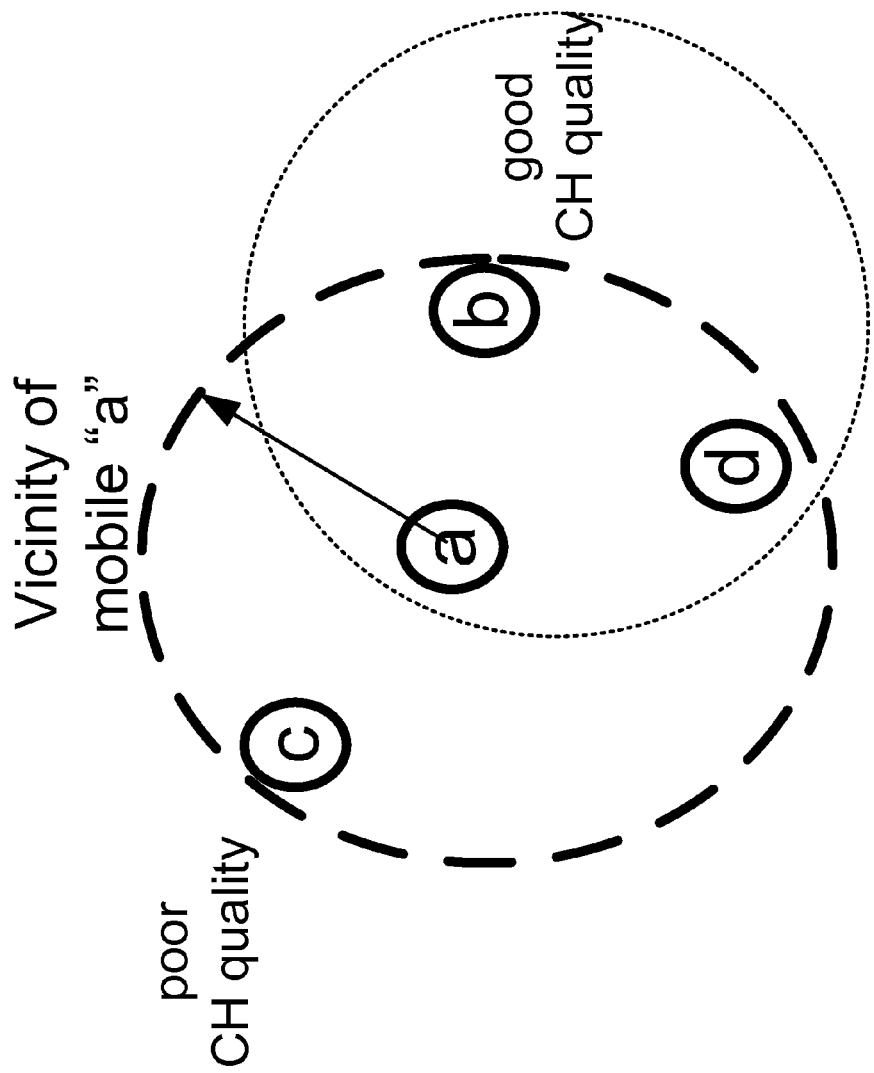
FIG. 2 is a block diagram depiction of an example scenario involving four mobiles.

We are proposing an approach that seeks to provide a generic solution that can leverage multiple wireless networks and technologies. For instance, using an LTE/cellular-system for distributing the content, while using a WiFi network for collecting the feedback from the users. To provide a greater degree of detail in making and using various aspects of the present invention, a description of our approach to improving multicast and a description of certain, quite specific, embodiments follows for the sake of example. FIGS. 1 and 2 are referenced in an attempt to illustrate some examples of specific problems and specific embodiments of the present invention.

Below is a list of references that are referred to throughout the present specification:

[KK01] Kuri, J., and Kasera, S. K.: 'Reliable multicast in multi-access wireless LANs', ACM Wirel. Netw., 2001, 7, (4), pp. 359-369.

[LH28:BLBP] Zhao Li; Herfet, T.; "BLBP: A Beacon-Driven Leader Based Protocol for MAC Layer Multicast Error Control in Wireless LANs," Wireless Communications, Networking and Mobile Computing, 2008. WiCOM '08. 4th International Conference on 12-14 Oct. 2008, pp. 1-4.

[LH28:HLBP] Zhao Li; Herfet, T.; "HLBP: A Hybrid Leader Based Protocol for MAC Layer Multicast Error Control in Wireless LANs," Global Telecommunications Conference, 2008. IEEE GLOBECOM 2008. IEEE, vol., no., pp. 1-6, Nov. 30, 2008-Dec. 4, 2008.

[GSL03] Gupta, S. K. S., Shankar, V., and Lalwani, S.: 'Reliable multicast MAC protocol for wireless LANs'. IEEE ICC, Anchorage, USA, May 2003, pp. 93-97.

[SC03] Seok, Y., and Choi, Y.: 'Efficient multicast supporting in multi-rate wireless local area networks', Lecture notes Comput. Sci., 2003, 2662, pp. 273-283.

[BSS06] Basalamah, A., Sugimoto, H., and Sato, T.: 'Rate adaptive reliable multicast MAC protocol for WLANs'. Proc. VTC, Melbourne, Australia, May 2006, pp. 1216-1220.

[VCOST07] Villalon, J.; Cuenca, P.; Orozco-Barbosa, L.; Seok, Y.; Turletti, T.; "ARSM: a cross-layer auto rate selection multicast mechanism for multi-rate wireless LANs," Communications, IET, vol. 1, no. 5, pp. 893-902, October 2007.

[CKM+09] Chandra, R.; Karanth, S.; Moscibroda, T.; Navda, V.; Padhye, J.; Ramjee, R.; Ravindranath, L.; "DirCast: A practical and efficient Wi-Fi multicast system," Network Protocols, 2009. ICNP 2009. 17th IEEE International Conference on, vol., no., pp. 161-170, 13-16 Oct. 2009.

[Cisco] Cisco, White-paper, Optimizing Enterprise Video Over Wireless LAN, 2010. [Aruba] Aruba Video Quick Reference & Design Guide, Aruba networks, http://www.arubanetworks.com/pdf/technology/DG_Video-Reference-and-Design-Guide.pdf

[802.11aa] IEEE 802.11aa draft—Robust Audio Video Transport Streaming.

In IEEE 802.11 WLANs, multicasting is specified as a simple broadcasting mechanism that does not make use of ACK frames. According to the IEEE 802.11 standards, all frames with a multicast and broadcast address should be transmitted at one of the rates included in the basic rate set. Several studies on multicasting in IEEE 802.11 WLANs have focused on improving transmission reliability. The most common approach is based on integrating automatic repeat request (ARQ) mechanisms into the protocol architecture. The main challenge of this approach is generating the appropriate acknowledgement messages as well as minimizing the number of retransmissions of each multicast message.

One proposal in this area is the work of Kuri and Kasera [KK01] that proposed a leader-based protocol (LBP) ARQ mechanism. LBP elects one of the multicast group receivers as the leader and allows the leader receiver to send acknowledgement (ACK) and the non-leader receivers to send negative acknowledgement (NACK). After a multicast message transmission, the leader receiver sends an ACK in reply if the data is received correctly, or does nothing otherwise. If any non-leader receiver detects a transmission error, it sends a NACK. The NACK frame collides with the ACK, if sent by the leader receiver. When the AP receives an ACK, it considers the transmission as successful. Otherwise, the AP repeats the whole procedure and retransmits the data until the number of times for retransmission is beyond the retransmission limit LBP suffers from three main problems: (a) If the entire data frame is lost, the non-leader receivers cannot reply with NACKs. Thus, in practice LBP is not reliable for non-leader receivers. (b) LBP suffers from poor performance when the channel error rates are high. Notice that the non-leader receivers send NACKs whenever the received frame is in error, regardless of whether this erroneous frame has been received correctly before or not. Thus in case of a NACK, the AP has to retransmit the message again until all receivers receive the data frame correctly during the same transmission. (c) The LBP does not provide statistics of the channel condition experienced by the mobiles. Therefore, the AP does not adapt the multicast PHY rate to the state of receivers. This may cause inefficient resource usage of the Wi-Fi channel.

Addressing these shortages of the LBP mechanism, Li and Herfet proposed two improved schemes to the LBP proposal in [LH28:BLBP] and [LH28:HLBP]. In the Beacon-driven Leader-based Protocol (BLBP) [LH28:BLBP], a beacon frame is sent before any multicast message. The Beacon message contains the sequence number of the multicast message as well as a timer for sending NACK messages. This information enables each non-leader receiver to check if it has already received the transmitted multicast message. Furthermore, it provides the receiver a time window for sending a NACK message. In [LH28:BLBP] the authors combine BLBP and packet level FEC and propose a Hybrid Leader Based Protocol (HLBP) for the MAC layer multicast error control. HLBP uses block erasure codes for dealing with poor channel conditions.

Gupta et al. [GSL03] present a reliable multicast MAC protocol, termed the 802.11MX protocol. The 802.11 MX uses an ARQ mechanism supplemented by a busy tone signal. When a mobile associated with a multicast group receives a corrupted packet, it sends an NACK tone instead of actually transmitting an NACK frame. Upon detecting the NACK tone, the sender will retransmit the data packet. On the contrary, if the AP does not detect the NACK tone, the AP assumes that the transmission of the multicast packet has been successfully completed. Since the 802.11MX mechanism does not need a leader to operate, it performs better than the LBP protocol in terms of both data throughput and reliability. However, this mechanism requires significant changes to the 802.11 standard. In particular, it assumes the availability of an out-of-band signaling channel for each AP in order for the multicast receivers to transmit the NACK tone.

The studies in [SC03], [BSS06] and [VCOST07] present rate adaptation mechanisms for multicast transmissions with the aim of improving the channel utilization. Seok and Choi [SC03] present the necessity of a multicast rate adaptation mechanism for WLANs. They present a multicast rate selection algorithm based on the traffic load of the WLAN and the channel condition of the multicast receivers. If the WLAN is not congested, the multicast is set to use a higher PHY rate than the data rates in basic service set (BSS) basic rate set parameter for mitigating the congestion. Otherwise, the multicast rate is adjusted according to the worst channel condition among channel conditions of all multicast receivers. However, this mechanism assumes that the AP knows the channel condition of each multicast receiver. In [BSS06] the authors introduced the rate adaptation and reliable multicast delivery scheme. In this scheme the transmitter first sends an RTS frame to indicate the beginning of a multicast transmission. The RTS frame is used by all the multicast receivers to measure the receiver signal strength. Then, each multicast receiver sends a variable length CTS frame whose length is inversely proportional to the experienced channel quality. Thus, receivers with low channel quality will send long CTS frames. Note that the CTS frames will collide. However, the AP can sense the duration of the longest CTS frame and use this duration for adjusting the transmission bit rate of the multicast frame.

The authors of [VCOST07] propose a cross-layer auto rate selection multicast mechanism for multi-rate wireless LANs, called ARSM. This scheme can be viewed as a variant of the LBP when each mobile device in the multicast group evaluates its channel condition from the AP by getting the RSSI (received signal strength indication) information from its PHY layer. Then the mobile that suffers from the lowest RSSI is selected as the group leader. The AP uses the RSSI information from the leader for selecting the desired bit-rate of multicast transmissions.

Independent of the above mentioned work on generating an appropriate number of acknowledgement messages and minimizing the number of retransmissions for multicast, there is a different area of work that involves utilizing unicast flows to transmit multicast flows. Several studies propose to map each multicast flow to a few unicast flows. For instance, the DirCast scheme converts multicast packets to unicast packets targeted to certain selected multicast receivers. Other receivers receive these packets by listening in promiscuous mode. The target receivers are carefully selected to minimize loss rate experienced by the non-targeted receivers. If necessary, mobiles are forced to change the AP they are associated with. In addition, DirCast uses proactive adaptive FEC to further reduce the loss rate and implements a novel virtual multicast interface in order to be compatible with the security needs of the enterprise. In industry, several IEEE 802.11 equipment vendors such as Cisco [Cisco], Aruba [Aruba] and several others solve the drawbacks of the Wi-Fi multicast services by converting each multicast packet into several unicast packets, at the medium access control (MAC) layer and sending individual unicast packets to each one of the receivers.

Currently, a new IEEE 802.11 standard is in progress, termed IEEE 802.11aa [802.11aa]. The goal of this draft is to standardize MAC layer enhancements for more reliable multicast transmission of real-time multimedia streams over wireless LANs. This extended reliability is provided via a retransmission mechanism (ARQ), which is referred to as "More Reliable Groupcast" (MRG). In MRG, the group membership of every multicast flow is known (e.g., by using Internet Group Management Protocol (IGMP) snooping). After the transmission of one or several multicast packets the sender (typically the AP) invokes a Groupcast Block-ACK polling process. In such a process, each receiver individually provides a bit map of previously correctly received multicast packets. Using this information the sender determines the packets that should be retransmitted, which are sent again to the entire group.

All of the above schemes suffer from one or both of the following weaknesses. Some of them (IEEE-802.11aa and DirCast) cannot scale to deal with a large number of mobile users. Others can be viewed as variations of leader-based protocol (LBP) which may not detect many lost packets mainly in noisy environments or as a result of the hidden node problem.

Two solutions have been recently proposed for augmenting the multicast services of WiFi networks with a feedback (FB) mechanism. In these solutions, some of the receivers are selected as feedback nodes and inform the transmitter, either the AP or the video server, about the QoS that they experience. Then, based on these feedback reports the transmitter determines the appropriate actions, (such as changing the multicast transmission bit-rate, adding FEC or performing retransmission) for ensuring high QoS to the users. The two proposals differ in the way the feedback node are determined. In one, the FB nodes are dedicated devices, which are placed in critical locations for providing the appropriate feedback to the sender. In the other, some of the mobile users are selected as feedback nodes which send FB reports to the multicast sender.

Consider three aspects of the system, referred to as media or channel:

1. Multicast (Content delivery) Media—The wireless network that is used for distributing the desired multimedia content by leveraging the standard multicast services either of cellular systems (LTE) or WiFi networks. In the following, we assume that the multicast media utilizes one of the wireless technologies that support multicast services, and we focus our discussion on the feedback mechanism.

2. Negotiation Media—This media is based on peer-to-peer communication between the receivers in order to meet two objectives: (i) Dynamic selection of the feedback mobiles (if used) and (ii) determining the feedback reports that represent the users experience from a group of adjacent mobiles. For cellular systems that do not support a peer-to-peer communication mode, this media should probably be based on WiFi or an alternative technology such as Bluetooth. The negotiation media is the crux of the proposed solution.

3. Feedback Media—This media is the wireless network that is used for providing feedback to the content sender. The feedback should contain information about the quality of the multicast service experienced by the feedback nodes as well as the adjacent receivers. It may contain the signal-to-noise ratio (SNR) information of the multicast messages, packet loss, etc., and it should be sent periodically to the sender. The feedback media may be either a cellular or WiFi network and it may utilize unicast or multicast connections based on the setting. In the case that the feedback media is WiFi, the negotiation and feedback aspects of the proposed system can be combined.

The following section provides a detailed description of the Negotiation Media. Consider two types of feedback nodes:
(a) Dedicated feedback nodes—In this approach a set of receivers, termed feedback (FB) nodes, are statically deployed at strategic locations of the considered area and provide QoS reports or reports of channel conditions for the multicast services to the sender (system). For providing these reports the FB node may consult with adjacent mobiles about the service quality they experience.
(b) Feedback Mobiles (FBMs)—In this approach some of the mobiles volunteer to represent all of the receiving mobiles and provide FB reports to the sender.

In both approaches the FB nodes or FBMs may send the multicast channel quality reports or QoS reports by using either unicast cellular connections or via a WiFi network. In approach (b) above, multicast connections may be used for combining the negotiation and the feedback aspects of the system, however, the feedback information can also be sent using unicast messages.

To simplify the description, we assume that all the mobiles listen to a single multicast sender that distributes the content. This can be realized by a single wireless transmitter that covers the considered area, or by multiple small cells that send identical synchronized transmissions. If the system contains several independent multicast transmitters, such as WiFi networks with multiple APs, we assume that each mobile gets its service from a single sender and consider only the set of mobiles that get their service from the same multicast sender.

We now describe a fully-distributed coordinate-free mechanism for dynamic selection of feedback (FB) mobiles. The solution is agnostic of the exact locations of the mobiles and does not require any assistance from the infrastructure system. In the following description, it is assumed that the negotiation media is a WiFi channel and all the mobiles listen to a predefined wireless channel that is used for this purpose. To this end, the communication between the mobiles is based on WiFi ad-hoc mode without the need for AP support.

Two mobiles are considered adjacent if the distance between them is at most a given maximal distance. Since the distance between the two mobiles may be unknown, we say that two mobiles are adjacent if the channel quality between them is above a certain threshold "H"; this is based on the assumption that the quality (received signal strength or SNR) of a channel decreases with the distance between the end-nodes.

The FBM selection process seeks to find with minimal communication overhead a small set of feedback mobiles that satisfies the following condition:

Every non-FB mobile "u" is adjacent to a FB mobile "v" that experiences (*) similar or lower multicast channel quality than the channel quality observed by "u".

Note that the problem of finding the minimal number of feedback mobiles is a variant of the minimal independent set problem which is known to be NP-hard, even when all the information of the mobile locations is known. Thus, our schemes do not guarantee to find the optimal solution. Nevertheless, under the assumption that the mobiles can evaluate their distance from other feedback mobiles, we can prove an approximation ratio of 5. Meaning that our schemes will select at most 5 times the number of feedback mobiles required by the optimal solution.

In this process every mobile is in one of three states (see state diagram 100 of FIG. 1):
(i) Feedback mobile (FBM)—The mobile has been selected as FB mobile.
(ii) Volunteer—The mobile volunteered to serve as FB mobile. This is a temporary state shortly after a mobile detects that there are no other FB mobiles in its vicinity with lower or similar multicast channel quality.
(iii) Non-FBM—A regular mobile which is aware of other FB mobiles in its vicinity with similar or lower multicast channel quality.

In our scheme, each FBM sends FB-NOTIFICATION messages to the multicast sender. The FB-NOTIFICATION message contains the quality of the multicast service that it experiences, for example, multicast channel SNR, ratio of lost packets, etc. In addition, each FBM also periodically broadcasts to all the mobiles in its vicinity FBM-ACTIVE messages with multicast channel quality it observes (e.g. SNR, ratio of lost packet, etc). These messages are important for maintaining a small set of FBMs that meets the requirement (*) above. For purposes of discussion, we will assume that at least one FBM-ACTIVE message is sent at each time period T. All the receiving mobiles (both FBMs and non-FBMs) listen to this channel and use the information of the FBM-ACTIVE messages to determine whether they should become FBMs or cease serving as FBMs, as described below.

A non-FBM becomes an FBM if there is no adjacent FBM in its vicinity that experiences a similar or worse multicast channel condition. Each mobile verifies if this requirement is satisfied by checking the following two conditions:
(a) If it does not detect an FBM-ACTIVE message within a period of T with message reception quality (SNR) above a certain threshold H. (Note that this condition implies there are no other mobiles adjacent to this mobile).
(b) Otherwise, if all the received FBM-ACTIVE messages with SNR above H report higher multicast channel condition than the quality of the multicast channel observed by the considered mobile.

A mobile that meets one of these two conditions volunteers to serve as FBM. It sends VOLUNTEER message to all the mobiles in its vicinity, which specifies the multicast channel quality it experiences, like in the FBM-ACTIVE message. The VOLUNTEER message is sent a few times during a time period of T.

If the volunteering mobile received other VOLUNTEER messages with SNR quality above H, then only one of the volunteering mobiles needs to become a FBM, that is, the one that experiences the worst multicast channel quality. In case of a tie, the volunteering mobile with the lowest ID is selected. The volunteering mobile that wins the tie breaking condition, referred to as the "winner", becomes the FBM and it sends FBM-ACTIVE message, the other volunteering mobiles, once they receive the FBM-ACTIVE message of the winner, they return to non-FBM state and send NON-FBM messages. Recall that the FBM selection is a distributed process where some of the volunteering mobiles may not be able to receive some of the other VOLUNTEER messages. Thus, it is important that a volunteering mobile will return to a non-FBM state only after receiving a FBM-ACTIVE message of the winner, otherwise a group of mobiles may remain without a FBM as described in Example 1 below and illustrated by diagram 200 of FIG. 2.

EXAMPLE 1

Consider the four mobiles a, b, c, d shown in diagram 200 with ID(a)<ID(b)<ID(c)<ID(d). Assume that the four mobiles use their SNR values for evaluating the quality of the multicast channel (MC) that they experience. The detected SNR value of a mobile is denoted by "$MC_{SNR}$(mobile)" and the $MC_{SNR}$ values of the four mobiles are as follows:

$MC_{SNR}$(a)=$MC_{SNR}$(b)=$MC_{SNR}$(d)=good multicast channel quality and $MC_{SNR}$(c)=poor multicast channel quality Moreover, assume that mobile "a" can decode the messages of the other three mobiles, but mobile "b" and "d" cannot decode the messages of mobile "c". Now, consider the case that all mobiles send VOUNTEER messages. Since mobiles "b" and "d" receive the VOLUNTER message of mobile "a" but not the one from mobile "c", they expect mobile "a" to become an FBM. However, mobile "a" receives the VOLUNTEER message of mobile "c" and expects "c" to become FBM.

Case I: If mobiles "b" and "d" don't wait for the FBM-ACTIVE message of mobile "a" and return to non-FBM state then they don't have a FBM in their vicinity.

Case II: Mobiles "b" and "d" wait for the FBM-ACTIVE message of mobile "a". Since they receive NON-FBM message from mobile "a" they understand that mobile "a" is not the winner in its vicinity (in our example mobile "c" is the winner) and therefore one of them should become a FBM. Since, ID(b)<ID(d) mobile "b" becomes the FBM and sends a FBM-ACTIVE message. After getting this message, mobile "d" sends NON-FBM message. Consequently the selected set of FBMs are "c" and "b", which is the minimal set of FBMs that meet requirement (*) above.

An FB mobile may return to non-FBM state if it detects that there is another active FBM in its immediate vicinity (after receiving FBM-ACTIVE messages with multicast channel quality above the threshold H) that experiences lower multicast channel quality. Once a FBM detects such a FBM (not in volunteering state) it returns to non-FBM state and sends NON-FBM message to its neighbors. Recall that after sending this message some of the adjacent mobiles may move to volunteering state and eventually become FBMs, as described above.

We now consider the situation where the dynamically selected FBMs provide feedback in the form of FB-NOTIFICATION messages to the system about the quality of the multicast channel based on negotiation with adjacent mobiles in their vicinities. As multicast channel conditions vary with time and movement of mobile nodes, the FBM selected earlier might not be experiencing the worst multicast channel condition among all mobile nodes in its vicinity. Therefore, a mechanism is desired to determine the worst multicast channel condition experienced by all the mobile nodes in the vicinity of each FBM.

In this approach, each FBM sends its FB-NOTIFICATION messages directly to the system (that is, the multicast sender) by using either unicast upstream cellular links or WiFi connections. In addition, it broadcasts the feedback information to the mobiles in its vicinity by sending FB-ECHO messages over the negotiation channel. These messages specify the multicast channel quality that FBM experiences with some additional information. The mobiles listen to the FB-ECHO messages, which may arrive from various FBMs. If all these messages indicate multicast channel quality higher than the one experienced by a given mobile, the latter sends a FB-REPORT message over the negotiation channel designated to its closest FBM, which specifies the multicast channel quality observed by the considered mobile. Note that for proximity estimation mobiles may evaluate the signal strength or SNR of the received FB-ECHO message and consider the closest FBM as the one with the strongest signal.

An FBM that receives an appropriate FB-REPORT modifies its FB-NOTIFICATION message accordingly and in addition to sending the modified FB-NOTIFACATION message to the system it also advertises its revised FB notification in the subsequent FB-ECHO messages. Thus, in the following we assume that each FB-ECHO message carries evaluation of the multicast channel conditions experienced by both the FBM as well as reports from adjacent mobiles. For ensuring efficient operation of the FB negotiation process two aspects should be resolved:

1. Minimizing the number of non-FB mobiles that sends FB-REPORT messages
2. Ensuring persistent FB notification to the multicast sender based on the multicast channel quality experienced by the group.

When a FBM provides a multicast channel quality that is too optimistic, multiple non-FBMs may be interested to send FB-REPORT messages. Such scenario may result in multiple transmissions of FB-REPORT messages and even with collisions of these messages. To avoid such a situation, one may use the following mechanism. Once a non-FBM decides to send a FB-REPORT message, it waits a random time before sending the message. This delay is inversely proportional to the gap between the multicast channel quality reported in the FB-ECHO message and the multicast channel quality experienced by the mobile. Thus, if the quality gap is big then the delay is short (with some random variation) otherwise the delay is long. This method ensures that a non-FBM that experiences very poor multicast channel condition relative to the other mobiles in its vicinity, will send its FB-REPORT message before the other mobiles that are considering sending FB-REPORT messages. Thus, the latter can suppress their transmissions of FB-REPORT messages.

Consider the case that the FB-NOTIFICATION message sent to the multicast sender is the outcome of a FB-REPORT message received by the FBM. This implies that the FB-NOTIFICATION message actually indicates the multicast channel quality observed by the sender of the FB-REPORT message. Let us refer to this mobile as "FB-reporter". Thus to preserve appropriate and consistent feedback to system, the FBM should consult with the FB-reporter about the appropriate feedback. This negotiation is achieved by including the following three parameters in each FB-ECHO message;

1. The multicast channel quality as observed by the FBM.
2. The last FB-reporter—none, if no such update for a given time interval, for example, a duration D.
3. The multicast channel quality as observed by the FB-reporter.

In response to this message, the FB-reporter has higher priority to send its updates to the FBM before other mobiles in the vicinity of the FBM. If the FB-reporter experiences inferior multicast channel condition than the reported SNR in the FB-ECHO message, then it immediately sends a FB-REPORT message with the appropriate multicast channel SNR. Otherwise, it periodically sends FB-REPORT messages, at least once at every time interval with duration D.

Since the channel quality as well as the locations of the mobiles may change in time, other mobiles may experience multicast channel quality of poorer quality than the FB-reporter. In such case the process described above can be used for selecting a new FB-reporter and providing the proper FB-NOTIFICATION message to the multicast sender.

The approach above provides a scalable solution for providing quasi-reliable multicast services for a wireless system that combines various wireless technologies, such as cellular systems (LTE) and IEEE 802.11 technologies (WiFi). While this approach cannot guarantee correct reception of every multicast message by every receiver that listens to the multicast group, it statistically detects most of the instances of incorrect reception of multicast messages. Moreover, it enables rate-adaption of the multicast messages for efficient usage of the wireless channel.

Existing solutions either cannot scale to support multicast flow to a large number of mobile devices (e.g., unicast based solutions or solution based on Block-ACK) or they may not detect many of the collisions (e.g., Leader-Based Protocol—LBP like solutions). Our solution detects the vast majority of the collisions or incorrect reception of multicast messages while using a relatively small number of feedback mobiles (FBMs) that send feedback to the multicast sender.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Aspects of embodiments of the present invention can be understood with reference to FIGS. 3 and 4. Diagram 300 of FIG. 3 is a logic flow diagram of functionality performed by a feedback mobile device in accordance with various embodiments of the present invention. In the method depicted in diagram 300, a feedback mobile device receives (301), from a multicast sender, a multicast transmission for a plurality of mobile devices, the feedback mobile device being one of the plurality of mobile devices, the plurality of mobile devices further including a group of non-feedback mobile devices. The feedback mobile device transmits (302) an indication of feedback mobile channel quality observed by the feedback mobile device to the multicast sender and to the group of non-feedback mobile devices. The feedback mobile device receives (303) from at least one non-feedback mobile device, an indication of non-feedback mobile channel quality at the at least one non-feedback mobile device and transmits (304) an indication of the non-feedback mobile channel quality to the multicast sender and to the group of non-feedback mobile devices.

Many embodiments are provided in which the method above is modified. For example, in many embodiments receiving (such as in 301) the multicast transmission, by the feedback mobile device from the multicast sender, involves receiving the multicast transmission via a first wireless access network and transmitting (such as in 302) by the feedback mobile device the indication of feedback mobile channel quality observed by the feedback mobile device to the multicast sender involves transmitting the indication of feedback mobile channel quality to the multicast sender via a second wireless access network. In some embodiments, the first wireless access network is a cellular wireless network and the second wireless access network is an IEEE 802.11-based wireless network.

In many embodiments, transmitting (such as in 302) by the feedback mobile device the indication of feedback mobile channel quality observed by the feedback mobile device to the multicast sender and to the group of non-feedback mobile devices involves transmitting the indication separately to the multicast sender and to the group of non-feedback mobile devices. Also, in many embodiments, transmitting (such as in 304) by the feedback mobile device the indication of the non-feedback mobile channel quality to the multicast sender and to the group of non-feedback mobile devices involves transmitting the indication separately to the multicast sender and to the group of non-feedback mobile devices. In some embodiments, transmitting (such as in 304) by the feedback mobile device the indication of the non-feedback mobile channel quality to the multicast sender and to the group of non-feedback mobile devices involves additionally transmitting, to the group of non-feedback mobile devices, an indication of feedback mobile channel quality observed by the feedback mobile device and an indication of the identity of the at least one non-feedback mobile device.

Diagram 400 of FIG. 4 is a logic flow diagram of functionality performed by a non-feedback mobile device in accordance with various embodiments of the present invention. In the method depicted in diagram 400, a non-feedback mobile device receives (401), from a multicast sender, a multicast transmission for a plurality of mobile devices, the non-feedback mobile device being one of the plurality of mobile devices, the plurality of mobile devices further including a feedback mobile device. The non-feedback mobile device receives (402), from the feedback mobile device, an indication of feedback mobile channel quality at the feedback mobile device and determines (403) whether to report an indication of non-feedback mobile channel quality based on channel quality observed by the non-feedback mobile device. The non-feedback mobile device then transmits (404) an indication of the non-feedback mobile channel quality observed by the non-feedback mobile device to the feedback mobile device.

Many embodiments are provided in which this method of diagram 400 is modified. For example, in many embodiments, determining (such as in 403) by the non-feedback mobile device whether to report involves determining that the channel quality observed by the non-feedback mobile device is lower than the feedback mobile channel quality indicated. In some embodiments, the non-feedback mobile device also receives an indication of non-feedback mobile channel quality from the feedback mobile device and determines (such as in 403), as part of determining whether to report, that the channel quality observed by the non-feedback mobile device is lower than the non-feedback mobile channel quality indicated. In some embodiments, determining (such as in 403) by the non-feedback mobile device whether to report involves delaying to report when the non-feedback mobile device is not a reporter non-feedback mobile device.

The operation of a feedback mobile device, such as described with respect to diagram 300, may be performed by a mobile device apparatus that includes a transceiver and a processing unit, communicatively coupled to the transceiver. The mobile device is one of a plurality of mobile devices, the plurality of mobile devices including a group of feedback mobile devices and a group of non-feedback mobile devices, and the mobile device is one of the group of feedback mobile devices. The processing unit is configured to receive, via the transceiver from a multicast sender, a multicast transmission for the plurality of mobile devices. The processing unit is also configured to transmit, via the transceiver, an indication of feedback mobile channel quality observed by the mobile device to the multicast sender and to the group of non-feedback mobile devices, to receive, via the transceiver from at least one non-feedback mobile device, an indication of non-feedback mobile channel quality at the at least one non-feedback mobile device, and to transmit, via the transceiver, an indication of the non-feedback mobile channel quality to the multicast sender and to the group of non-feedback mobile devices. Many embodiments are provided in which this mobile device is modified.

The operation of a non-feedback mobile device, such as described with respect to diagram 400, may be performed by a mobile device apparatus that includes a transceiver and a processing unit, communicatively coupled to the transceiver. This mobile device is one of a plurality of mobile devices, the plurality of mobile devices including a group of feedback mobile devices and a group of non-feedback mobile devices, and this mobile device is one of the group of non-feedback mobile devices. The processing unit is configured to receive via the transceiver a multicast transmission for the plurality of mobile devices from a multicast sender and to receive, via the transceiver from a feedback mobile device, an indication of feedback mobile channel quality at the feedback mobile device. The processing unit is also configured to determine whether to report an indication of non-feedback mobile channel quality based on channel quality observed by the mobile device and to transmit, via the transceiver an indication of the non-feedback mobile channel quality observed by the mobile device to the feedback mobile device. Many embodiments are provided in which this non-feedback mobile device is modified.

In general, components such as processing units and transceivers in a mobile device apparatus are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, the mobile device apparatus represents a known device that has been adapted, in accordance with the description herein, to implement multiple embodiments of the present invention.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for improved multicast service using negotiated feedback, the method comprising:

receiving, by a feedback mobile device from a multicast sender, a multicast transmission for a plurality of mobile devices, the feedback mobile device being one of the plurality of mobile devices, the plurality of mobile devices further including a group of non-feedback mobile devices;

transmitting by the feedback mobile device an indication of feedback mobile channel quality observed by the feedback mobile device to the multicast sender and to the group of non-feedback mobile devices;

receiving, by the feedback mobile device from at least one non-feedback mobile device, an indication of non-feedback mobile channel quality at the at least one non-feedback mobile device;

transmitting by the feedback mobile device an indication of the non-feedback mobile channel quality to the multicast sender and to the group of non-feedback mobile devices, wherein transmitting by the feedback mobile device the indication of feedback mobile channel quality observed by the feedback mobile device to the multicast sender and to the group of non-feedback mobile devices comprises transmitting the indication of feedback mobile channel quality to the multicast sender and separately to the group of non-feedback mobile devices, and wherein transmitting by the feedback mobile device the indication of the non-feedback mobile channel quality to the multicast sender and to the group of non-feedback mobile devices comprises transmitting by the feedback mobile device the indication of the non-feedback mobile channel quality to the multicast sender and separately to the group of non-feedback mobile devices.

2. The method of claim 1,
wherein receiving, by the feedback mobile device from the multicast sender, the multicast transmission comprises receiving the multicast transmission via a first wireless access network, and
wherein transmitting by the feedback mobile device the indication of feedback mobile channel quality observed by the feedback mobile device to the multicast sender comprises transmitting by the feedback mobile device the indication of feedback mobile channel quality observed by the feedback mobile device to the multicast sender via a second wireless access network.

3. The method of claim 2, wherein the first wireless access network is a cellular wireless network and the second wireless access network is an IEEE 802.11-based wireless network.

4. The method of claim 1, wherein transmitting by the feedback mobile device the indication of the non-feedback mobile channel quality to the multicast sender and to the group of non-feedback mobile devices comprise
additionally transmitting, to the group of non-feedback mobile devices, an indication of feedback mobile channel quality observed by the feedback mobile device and an indication of the identity of the at least one non-feedback mobile device.

5. An article of manufacture comprising a non-transitory, processor-readable storage medium storing one or more software programs which when executed by one or more processors performs the steps of the method of claim 1.

6. A mobile device of a plurality of mobile devices, the plurality of mobile devices comprising a group of feedback mobile devices and a group of non-feedback mobile devices, the mobile device being of the group of feedback mobile devices and comprising:
a transceiver;
a processing unit, communicatively coupled to the transceiver, comprising at least one processor coupled to a memory and configured
to receive, via the transceiver from a multicast sender, a multicast transmission for the plurality of mobile devices,
to transmit, via the transceiver, an indication of feedback mobile channel quality observed by the mobile device to the multicast sender and to the group of non-feedback mobile devices,
to receive, via the transceiver from at least one non-feedback mobile device, an indication of non-feedback mobile channel quality at the at least one non-feedback mobile device, and
to transmit, via the transceiver, an indication of the non-feedback mobile channel quality to the multicast sender and to the group of non-feedback mobile devices,
wherein being configured to transmit the indication of feedback mobile channel quality observed by the mobile device to the multicast sender and to the group of non-feedback mobile devices comprises being configured to transmit the indication of feedback mobile channel quality to the multicast sender and separately to the group of non-feedback mobile devices, and
wherein being configured to transmit the indication of the non-feedback mobile channel quality to the multicast sender and to the group of non-feedback mobile devices comprises being configured to transmit the indication of the non-feedback mobile channel quality to the multicast sender and separately to the group of non-feedback mobile devices.

7. The mobile device of claim 6,
wherein being configured to receive the multicast transmission comprises being configured to receive the multicast transmission via a first wireless access network, and
wherein being configured to transmit the indication of feedback mobile channel quality observed by the mobile device to the multicast sender comprises being configured to transmit the indication of feedback mobile channel quality observed by the mobile device to the multicast sender via a second wireless access network.

8. The mobile device of claim 7, wherein the first wireless access network is a cellular wireless network and the second wireless access network is an IEEE 802.11-based wireless network.

9. The mobile device of claim 6, wherein being configured to transmit the indication of the non-feedback mobile channel quality to the multicast sender and to the group of non-feedback mobile devices comprises
being configured to additionally transmit, to the group of non-feedback mobile devices, an indication of feedback mobile channel quality observed by the mobile device and an indication of the identity of the at least one non-feedback mobile device.

* * * * *